Aug. 16, 1960     R. B. WHITE     2,949,054
THREADED SHAFT OF GLASS FIBER REINFORCED PLASTIC
Filed July 19, 1954     2 Sheets-Sheet 1
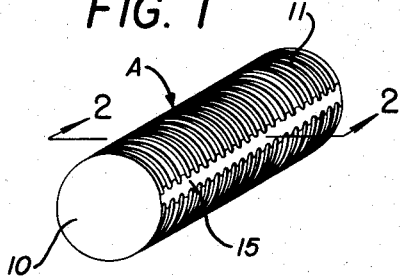
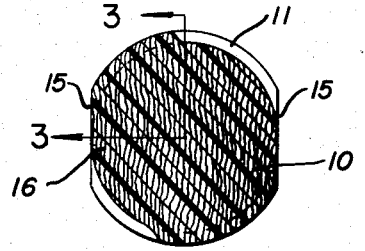
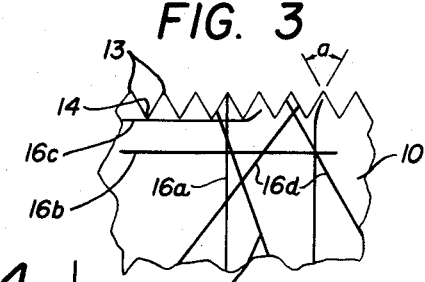
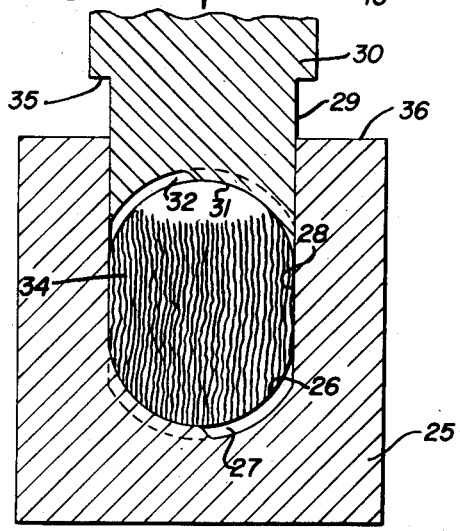
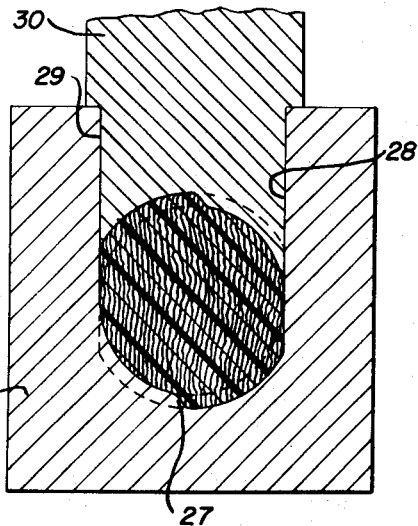
INVENTOR.
ROGER B. WHITE
BY
*Alfred C. Body*
ATTORNEYS

United States Patent Office 2,949,054
Patented Aug. 16, 1960

2,949,054

THREADED SHAFT OF GLASS FIBER REINFORCED PLASTIC

Roger B. White, Cleveland, Ohio, assignor to The Glastic Corporation, Cleveland, Ohio, a corporation of Ohio Filed July 19, 1954, Ser. No. 444,199

1 Claim. (Cl. 85—47)

This invention pertains to the art of fiber reinforced plastic and, more particularly, to threaded shafts, rods or bolts made of such material and the method of making same.

The invention particularly pertains to the use of fine glass filaments as the fibrous material and thermosetting resins as the plastic material and will be particularly described with reference thereto, although it will be appreciated that other forms of fibrous material may be employed or other forms of plastic material.

In the art of threaded shafts, the forces which the shaft must resist or support are transmitted to the shaft through the threads. While the shaft itself may be in tension, the threads normally have shear stresses imposed on them. The maximum force which can thus be imposed on the shaft is determined by shear strength of the threads generally at or adjacent the base thereof and the number of threads in engagement with the nut or the like.

The unit strength of each thread; that is, one complete revolution of each thread, is determined by the strength of the material in the thread itself and the area of the base of each thread. For a given size shaft, the area of the base is normally fixed, leaving the material itself as the determining factor for the ultimate strength of the threaded shafts. It is, of course, possible when the threads are relatively weak to employ longer threaded engagement with the shaft which is many times impracticable and undesirable.

This problem of strength in the threads is particularly apparent in the art of glass fiber reinforced plastics. In such materials, the strength comes primarily from the glass fibers. The plastic simply serves as a binder for the fibers and as a means for distributing the stresses in one fiber to adjacent fibers so that the ultimate strength is determined by the over-all mass of glass fibers in the body rather than any one individual fiber. The plastic material alone has relatively low strength, either in tension or in shear.

With glass fiber reinforced plastics, it is conventional to supply the glass fibers in the form of flat mats of short fibers or with yarn. With the fiber in this form, it has heretofore been practically impossible to force the glass fibers into the threads of the shaft where they can impart to the threads the strength so characteristic of glass fiber reinforced plastic products.

Normally, the glass fibers are impregnated with the resinous binder material and during the molding operation, the resinous binder material only is forced into the threads while the glass fibers extend along the core of the shaft from the roots of the threads inwardly. As pointed out above, such threads are normally quite unsatisfactory.

The present invention contemplates articles of the general type referred to, such as a threaded shaft, made of fiber, such as glass fiber, reinforced hardened plastic material, the method of manufacturing same and the mold therefor which overcomes all of the above referred to difficulties and provides, for example, a molded threaded shaft having the glass fibers extending in a continuous uncut manner from the body of the shaft into the threads at least over a major proportion of the circumference of the shaft.

In accordance with the invention, a molded threaded shaft is provided comprising a hardened plastic resin impregnating and binding together a plurality of high strength fibers including longitudinal fibers to give the shaft strength interlocked with transverse fibers with the ends thereof extending into the threads to give the threads strength in excess of strength of resin.

Generally, this arrangement of the fibers is obtained by so orienting the glass fibers prior to the molding thereof with the liquid resin material that the fiber ends or at least a large proportion thereof will be forced into the thread grooves of the mold during the molding operation.

Thus, the fibers, prior to molding, are all contained in parallel planes in one or a plurality of mats. The fibers in any one plane are all oriented in random directions. Such mats have a length in excess of the length of the shaft to be molded and a width in excess of the diameter of the shaft to be molded. In one form of the invention, the plane of the mats is parallel to the line of movement of the mold members as they move into mating engagement whereby the ends of the fibers extending at an angle to the length of the mats and reaching the edge of the mats will be forced into the threads of the mold members. Alternatively, the mats may be laid so that the plane thereof is transverse to the line of movement of the mold members and the mating edges of the molds are made to shear off the fiber ends on a line corresponding to the thread contour whereby the thread ends will extend into the threads of the mold.

The principal object of the invention is the provision of a threaded shaft formed of fibrous reinforced hardened plastic material of a maximum strength in the threads.

Another object of the invention is the provision of a threaded shaft formed from a hardened plastic material, thoroughly impregnating and binding together a plurality of fibers of high strength, a large proportion of such fibers extending into the threads in a continuous manner from the body of the shaft.

Still another object of the invention is the provision of a molded threaded shaft from glass fiber reinforced hardened plastic material wherein a large proportion of the glass fibers extend from the body of the shaft into the threads to provide maximum strength of the threads.

Still another object of the invention is the provision of a molded glass fiber reinforced hardened plastic threaded shaft wherein the glass fibers extend in random directions in planes generally parallel to the length of the shaft with the ends of at least a substantial number of such fibers extending into and forming a part of the threads.

The invention may take physical form in certain different-appearing articles of manufacture with differing internal core structure, preferred embodiments of which will be described in detail in this specification and illustrated in the accompanying drawings which are a part hereof, and wherein:

Figure 1 is an elevational view of one embodiment of a threaded shaft made in accordance with the present invention;

Figure 2 is a cross-sectional end view of Figure 1 showing generally in a schematic manner the orientation of the fibers;

Figure 3 is a fragmentary enlarged cross-sectional view of Figure 2 taken approximately on the line 3—3 thereof and showing the final position which fibers of varying degrees of orientation may be expected to take in carrying out the present invention;

Figure 4 is a cross-sectional view of mold members in open position and the fibrous material for molding positioned in the mold cavity for carrying out the method of the invention;

Figure 5 is a view similar to Figure 4 but showing the mold members in closed position;

Figure 6:
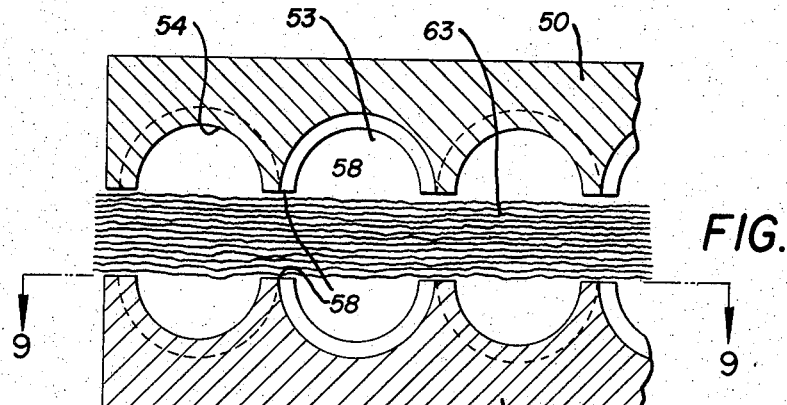
Figure 6 illustrates an alternative embodiment of the invention and shows a cross-sectional view of mold members in open relationship with fibers in place ready for molding.

Referring now to the drawings wherein the showings are for the purposes of illustration only and not for the purposes of limiting the invention, Figures 1 to 3 show a threaded shaft A comprised of a body or interior portion 10 having a plurality of threads 11 on its outer surface. These threads 11 may be of any desired cross-sectional configuration or pitch as is conventional in the threaded-shaft or threaded-bolt art, each thread being generally defined by angularly disposed sides terminating in a peak or apex 13 and a root 14. This root 14 may be said to define the outermost limits of the body of the shaft 10 and the apex 13 to define the maximum diameter of the shaft A. It will be noted that the sides 12 are angularly disposed relative to each other with an included angle $a$ therebetween.

While the threads 11 may form a continuous helix, in the preferred embodiment of the invention the shaft A has a pair of flats 15 on each side thereof having parallel surfaces and cutting away the threads 11 to a depth at least greater than the root depth of the threads. Thus, these threads, while in effect forming a continuous helix, are, in actuality, discontinuous over the length of the shaft A.

The shaft A is, in the preferred embodiment, made up of a molded glass fiber reinforced hardened plastic material.

The plastic or resinous material may be of any known type but it is preferred that it be of the thermosetting type; that is, when once heated to an elevated temperature for the time required for it to harden, it will not again soften upon further heating operations. The plastic material may be initially in the form of a relatively thin liquid or in the form of a relatively thick pliable mass, either of which will run or flow under pressure and then hardened to the molded shape when heated.

The orientation of the glass fibers in the shaft A is of particular importance to the invention. As shown schematically in Figure 2, the glass fibers, which in short lengths and under no external retraining forces are relatively straight, lie in generally parallel planes throughout the thickness of the shaft A as shown schematically by the lines 16 of Figure 2. Thus, these fibers extend in random directions as is shown in Figure 3 while all lying in planes parallel to the longitudinal axis of the shaft A as is shown by the sectional lines of Figure 2. It is to be noted that these planes are also parallel to the plane of the flats 15.

By so orienting all of the glass fibers relative to each other and relative to the axis of the shaft A, it is possible in a molding operation to cause a substantial number of the glass fibers or at least the ends thereof to enter into the thread-forming portions of the mold and, thus, impart their strength to the threads of the final molded shaft.

The random orientation of the fibers 16 in any one plane is clearly shown in Figure 3. For example, the fiber 16a extends in a direction perpendicular to the axis of the shaft and has a length at least greater than the maximum diameter of the shaft A such that when it is molded under pressure, the fiber ends can readily move into or toward the apex of the teeth either due to the longitudinal forces on the fiber itself or due to the movement of the plastic material flowing into the apex of the tooth and carrying with it the fiber ends, or both. Thus, it is preferred that the minimum length of fiber 16 employed is at least greater than the maximum diameter of the shaft A. It will be appreciated that in normal manufacturing techniques, there will be fibers of lesser length and the invention does not exclude such shorter fibers. In direct contradistinction to the fiber 16a is the fiber 16b which extends in a direction generally parallel to the axis of the shaft A and interiorly of the body 10 thereof. As can be seen, this fiber 16b does not extend into the teeth 11 and, therefore, can impart no strength thereto, although such fiber will impart strength to overall longitudinal strength of the shaft A. The fiber 16c has the same orientation as the fiber 16b but is on the outermost portion of the body 10. It will be seen that this fiber throughout its length bears against the roots of the teeth and does not enter into the teeth except for the ends thereof which overhang one of the teeth, which end, due to the flow of the plastic material into the teeth 11, will also tend to extend in the teeth and impart some strength thereto. If fibers of the nature of the fibers 16c have any substantial length, it will be seen that they can impart little to the over-all strength of the teeth 11. The fibers 16d are at an angle of orientation relative to the axis of the shaft generally not substantially greater than the included angle of the sides of the shaft and, as will be seen, the ends of these fibers can readily enter into the teeth 11 and impart their strength to the over-all strength of the teeth.

It will be appreciated from an examination of Figure 3 that the fibers which have an angle of orientation relative to the axis of the shaft approximating that of the included angle between the sides of the teeth readily extend into the teeth while those which have a lesser angle do not readily extend into the teeth. Thus, in accordance with the invention, if a maximum efficiency of use of the fibers is to be obtained, the major proportion of the fibers should have a substantial angle of orientation relative to the axis of the shaft.

Normally, these glass fibers are sold in the form of glass mats with the individual fibers having a random orientation but all in parallel planes, the individual fibers being bound together by a light binder material. Mats can be purchased having the fibers oriented in the desired manner as above pointed out. These mats normally come in relatively thin mats of relatively large area and must be cut into long strips which are then stacked one upon the other to the desired aggregate thickness approximating the diameter of the bolts prior to being placed in the mold.

Threaded shafts of the type to which this invention pertains when examined to determine the fiber orientation such as, for example, dissolving away the plastic material, show the fibers to be lying in a plurality of parallel planes with the fibers extending in the particular plane in any random direction. There is some longitudinal compression and buckling of the fibers due to the compression thereof in molding process but, in the main, a very distinct layering of the fibers is indicated, particularly when a plurality of stacked relatively thin fiber mats are employed to make the shaft.

Figures 4 and 5 show preferred embodiments of a mold employed to manufacture the shaft of Figure 1. This mold is comprised of a female member 25 having a cavity 26 therein generally U-shaped in cross section with the base of the cavity being arcuate and having threads 27 formed therein of somewhat less than 180-degree arc and terminating in relatively flat or plane side walls 28 parallel or slightly divergent to each other which extend upwardly a distance greater than the diameter of the shaft.

The male mold member 30 has a width such that its side walls 29 mate closely with the side walls 28 and has a lower arcuate end 31 with a threaded mold surface 32 of less than 180 degree arc. The threads are similar to and are so located as to, in effect, form a continuation of the threads 27 of the female mold member 25. The length of the members and, thus, the cavity may be as desired, depending on the length of the shaft to be molded. The member 30 has shoulders 35 which abut against the upper surface 36 of the member 25 and position the threads 32 and 27 when the members 25 and 30 are in mating relationship.

In the molding operation, a plurality of strips 34 of glass mat, each glass mat being comprised of a plurality of glass fibers arranged in random orientation in parallel planes, are placed in the mold cavity with the planes parallel to the side walls 28 as well as parallel to the line of movement of the mold members 25 and 30, which line of movement extends through the midpoint of the threaded surfaces 27 and 32 as well as through the center of the shaft A when finally molded. It will be noted from Figure 4 that the thickness of the stack of mats is approximately equal to that of the distance between the side walls 28, while the width or vertical height as viewed in Figure 4 is substantially greater than the ultimate diameter of the shaft A.

When the male mold member 30 is advanced toward the female mold 25, the glass fibers which have first been impregnated with a thermosetting resinous material of the type above indicated are compressed longitudinally, the ends of the glass fibers being forced into the threads 27 and 32 due to the longitudinal compression thereof or due to the resinous material being squeezed from the stack of mats into the threads, or both. If desired, the strips may have their edges cut with a serrated form corresponding to its cross-sectional shape of the threads. An even greater percentage of fibers in the threads can be obtained.

It will be noted from Figure 4 that the vertically extending side walls 28 of the female mold member 25 provide a lateral support for the fibers and position the fibers as shown in the figure prior to and during the time that the male mold member 30 is advancing to the closed position. The surfaces 29 should mate closely with the surfaces 28 so that no flash results at the mating line of the mold members. What flash is present is weak and does not interfere with the use of the shaft as is or the flash may be removed.

As is apparent from Figure 1, the threads have only a limited circumferential arc over diametrically opposite portions. Because of the many fibers extending into the threads, however, these limited portions have a very high strength, higher than anything heretofore known in the glass fiber reinforced plastic art. In fact, the strength of the limited arc threads is so much greater than threads known heretofore that the total thread strength of the limited arc threads is greater than the total thread strength of a continuous thread manufactured by heretofore known processes.

In some instances the mold width may be increased beyond that indicated so that a full thread is molded. The threads formed transverse to the movement of the mold will be relatively weaker but will impart something to the over-all thread strength.

Figure 9:
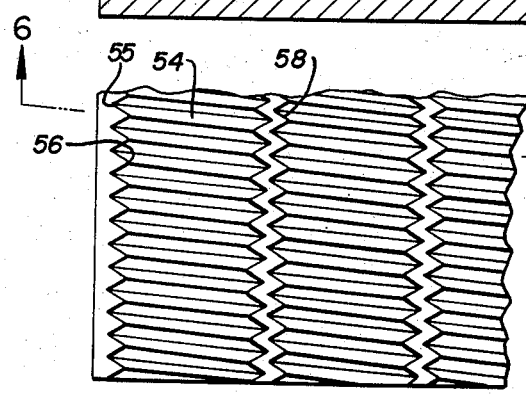
Figure 9 is a view of Figure 6 on the line 9—9 thereof.

Figures 6 through 9 show an alternative embodiment of the invention which, in a manner similar to the first described embodiment, produces a thread having a maximum strength over diametrically opposite portions of limited arcuate length. In this embodiment of the invention, a pair of upper and lower mold members 50, 51 are provided, each having a plurality of semi-circular mold cavities 53 therein. In Figure 6, the mold members 50, 51 have three mold cavities formed therein. Obviously, more or less can be employed. Each mold cavity 53 has a semi-circular threaded base 54, each thread having a root or valley 55 and a peak or apex 56. The spacing of adjacent cavities 53 is such that the surfaces of adjacent cavities are slightly spaced and meet in a narrow flat 58 which, as shown in Figure 9, generally has a serrated outline of a cross section of the ultimate shaft to be molded. This spacing of the axes of adjacent cavities may be varied so as to make the flat 58 of any desired width. A wider flat requires greater pressure to cut or shear the glass fibers. A narrower flat is sometimes unable to withstand the molding pressures employed over long periods.

The upper and lower mold cavities are identically formed and when the members are in mating relationship, the flat or edge 58 on the upper mold 50 will exactly coincide with the flat 58 on the lower member 51.

The left-hand edge of each mold member 50, 51 is shown as flat. It can be provided with a partial cavity having threads if desired of relatively short arcuate length forming the surface thereof. The other edge of the mold members 50, 51 would be likewise formed.

Each mold cavity 53 is defined by one half of a thread and the ends of each thread terminate in a relatively narrow flat which, as will appear, cuts through the fibers during the molding operation.

Figure 6 shows the mold members 50, 51 in the fully opened position. A stack of mats 63 formed of the fibers such as glass fibers and suitably impregnated with a heat-hardening liquid resin material is placed between the facing surfaces of these mold members. The stack of mats will generally have a thickness in excess of the ultimate diameter of the shaft to be produced. The mats extend at least across the openings of all of the cavities 53 of the mold members 50, 51. Thus, insofar as each mold cavity is concerned, the mats have a width greater than the ultimate diameter of the molded shaft.

Figure 7:
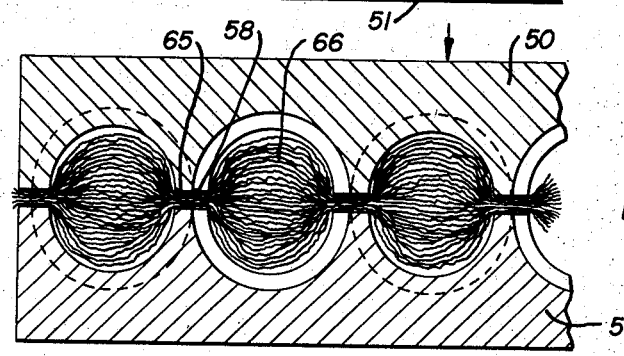
Figure 7 is a view similar to Figure 6 showing the mold members in partially closed relationship.
Figure 8:
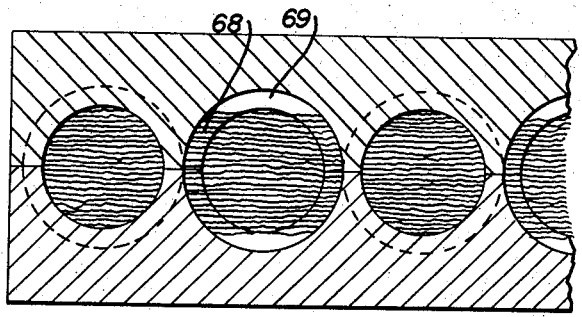
Figure 8 is a view similar to Figure 6 showing the mold members fully closed.

When the mold members 50, 51 are moved together, an action similar to that shown in Figure 7 results. The mats 63 are pinched between the edges 58 as shown at 65 with the intermediate portions 66 taking generally the form of a pillow or the like.

As the mold members 50, 51 move further together, a point is reached where the portions 65 are generally solidly compacted between the edges 58. The molding force required then rises and, eventually, the edges 58 sever the fibers in the portion 65 to have a cut edge corresponding to the contour of the edge 58. The edges of the cut fibers can then spring away from the compacted portion but, in so doing, they will follow the valleys 55 of the threads. This arrangement is shown somewhat schematically in Figure 8 wherein the fiber ends 68 are shown extending into the threads on both sides of the parting line of the mold members to a point generally up to a horizontal plane tangent with the peaks 56 in both the upper and lower mold members 50, 51. Above this plane, a few of the fibers will have worked their way into the thread members but, generally, the thread members at this part of the mold will be formed mostly of the plastic resin material as shown at 69. However, as pointed out with reference to the first described embodiment, the weaknesses in this portion of the threads is more than made up for by the increase of strength in the other portions of the thread where the fibers extend into the threads in large numbers and with a substantial density. This portion could be removed if desired.

In effect, the molding operation, by virtue of the edges 58, cuts or crushes the fiber ends to a shape conforming exactly to the cross-sectional contour of the threads and with the thread ends already extending to the base or valley of the threads in the mold. As soon as the fibers are cut, they can spring away from the cut due to their natural resilience with the ends guided by the threads of the mold, the ends will remain in these threads, producing the desired results; namely, a molded threaded shaft of fiber reinforced plastic material wherein the thread ends extend beyond the root diameter of the thread and into the threads themselves. Thus, a shaft is produced wherein it has longitudinally extending fibers to give the shaft longitudinal strength and transversely extending fibers extending into the threads to give the threads strength.

It will be noted that the transversely extending fibers all have a cut diameter corresponding to the maximum diameter of the threaded shaft and as they expand upwardly and downwardly from the line of the cut, they will have to be compressed slightly on their longitudinal length in order to extend in a chordal manner across the shaft.

Experimental runs using the present invention have enabled thread strength of almost twice that heretofore obtainable using conventional molding techniques and not employing the present invention.

The present invention has been described with reference to threaded shafts without heads or the like and with a uniform diameter helix from one end to the other. Obviously, the invention is applicable to the manufacture of headed bolts or to threaded shafts which taper from one end to the other.

It will also be appreciated that the invention has broader applications than the molding of threaded shafts. For example, it would appear to be quite applicable to the molding of gear racks wherein the same problem of causing the glass fibers to extend into the gear teeth exists. The invention is, as above indicated, particularly applicable to the manufacture of threaded shafts of any length and any diameter wherein the threads must have a maximum strength such as only can be imparted by the reinforcing glass fibers extending into the shaft and it is my intention that this phase of the invention be the primary one of interest.

Having thus described my invention, I claim:

An externally threaded, glass fiber reinforced, hardened plastic member composed of a plurality of glass fibers impregnated with a hardened plastic material, said member having oppositely disposed externally threaded portions on its periphery and between said threaded portions having flat sides which extend parallel to each other and parallel to the longitudinal axis of said member and which are located nearer to the longitudinal axis of said member than the root diameter of said threaded portions, said member having a plurality of said glass fibers therein which extend transverse to the longitudinal axis of the member and substantially parallel to said flat sides and have their ends disposed in said threaded portions.

References Cited in the file of this patent

UNITED STATES PATENTS

| | | |
|---|---|---|
| 647,094 | Heinn | Apr. 10, 1900 |
| 924,643 | Dart | June 15, 1909 |
| 1,198,874 | Sloper | Sept. 19, 1916 |
| 1,284,989 | Bayer et al. | Nov. 19, 1918 |
| 1,370,024 | Kempton | Mar. 1, 1921 |
| 1,608,698 | Koeser | Nov. 30, 1926 |
| 1,640,433 | Weldon | Aug. 30, 1927 |
| 1,900,049 | Ellison | Mar. 7, 1933 |
| 1,973,170 | Jacobi | Sept. 11, 1934 |
| 2,148,079 | Martin | Feb. 21, 1939 |
| 2,268,703 | Dickey | Jan. 6, 1942 |
| 2,510,693 | Green | June 6, 1950 |
| 2,576,864 | Valente | Nov. 27, 1951 |
| 2,594,838 | Alexander et al. | Apr. 29, 1952 |
| 2,629,894 | Boggs | Mar. 3, 1953 |
| 2,751,237 | Conley | June 19, 1956 |